United States Patent [19]

Meinhold et al.

[11] 4,029,630

[45] June 14, 1977

[54] PROCESS FOR THE MANUFACTURE OF STRUCTURAL ELEMENTS

[76] Inventors: Heinz Meinhold, Klettenbergstrasse 9, 6 Frankfurt am Main; Antonin Lev, Erzberger Strasse 15, 6056 Heusenstamm; Vlastislav Kunopik, Bockenheimer Landstrasse 79, 6 Frankfurt am Main, all of Germany

[22] Filed: May 3, 1974

[21] Appl. No.: 466,818

[30] Foreign Application Priority Data

May 8, 1973 Germany .......................... 2323170

[52] U.S. Cl. .................. 260/38; 106/290; 260/37 M
[51] Int. Cl.² .......................................... C08K 3/08
[58] Field of Search ........... 260/37 M, DIG. 40, 38; 106/290

[56] References Cited

UNITED STATES PATENTS

| | | | |
|---|---|---|---|
| 3,078,249 | 2/1963 | Russell | 260/40 R |
| 3,238,601 | 3/1966 | White | 260/38 X |
| 3,259,947 | 7/1966 | Knight | 260/DIG. 40 |
| 3,705,872 | 12/1972 | Wittenwyler | 260/DIG. 40 |
| 3,723,368 | 3/1973 | Brown et al. | 260/DIG. 40 |
| 3,846,366 | 11/1974 | Wallace | 260/37 M X |
| 3,849,356 | 11/1974 | Matsui et al. | 260/38 X |
| 3,878,142 | 4/1975 | Tisza | 260/38 X |

*Primary Examiner*—Sandra M. Person
*Attorney, Agent, or Firm*—Irving M. Weiner; Pamela S. Austin

[57] ABSTRACT

A product and a process for manufacturing the product, such as structural elements, wherein there is mixed together minerals as well as low melting metallic substances, to form a molding composition based on thermosetting phenolic resins. The mixed molding composition is then cured to form the product or structural elements.

13 Claims, No Drawings

PROCESS FOR THE MANUFACTURE OF STRUCTURAL ELEMENTS

The present invention relates to a process, a product, and a procedure for the manufacture of structural elements by curing molding compositions which are based on thermosetting phenolic resins. The structural elements may be used as buiding materials, buiding stones, floor tiles, roofing tiles, sewer pipes and as other molded articles in the construction industry.

BACKGROUND OF THE INVENTION

The presently most widespread technology for the manufacture of structural elements such as roofing tiles, floor tiles, etc., is based on the well established kiln technology, or on the processing of cement. In both cases the quality of the product depends on the starting materials, and on high quality labor and high energy cost manufacturing methods. In addition, high costs for molds are involved. Frequently, individual items are subject to breakage, resulting in a high reject rate. Furthermore, shortages in the supply of raw material occur.

It is therefore an object of this invention to make available a highly fireproof material, with high compressive strength, and bending strength characteristics, at favorable cost, and based on simple raw materials, such as sand, to which a plastic resin is added and to do so while avoiding or substantially reducing the disadvantages listed above. In addition, relatively simple processing techniques, and independence from cement as a raw material, are further objectives of the invention.

SUMMARY OF THE INVENTION

The present invention provides a process for manufacturing structural elements including the steps of mixing minerals as well as low melting metallic substances to form a molding composition based on thermosetting phenolic resins, and then curing the molding composition to form structural elements.

The present invention also provides a product produced in accordance with the novel process.

According to the invention, the above-mentioned objectives are achieved through the use of a molding composition which consists of a combination in minerals, and also comprises low melting metallic substances.

DETAILED DESCRIPTION

The novel manufacturing procedures, hereinafter described in detail, do not require special raw material grades, nor is a special pretreatment of the inorganic material a necessity. The manufacturing procedure excludes the use of cement and sodium or potassium silicate solutions (waterglass).

The primary binders used are commercially available organic thermosetting resins, such as, for instance, phenolic resins. Their highest strength characteristics are achieved by curing under controlled temperature conditions of from 40–450° C. To achieve the highest level of mechanical properties of the items produced, up to refractory characteristics at 1300° C, the invention calls for the use of a secondary binder, in the form of low melting metals, which are ground together with a predetermined quantity of inorganic materials, such as, for instance, clay or quartz containing clay. Such a powdery blend is added to the prepared crude molding composition, and mixed in the dry state until a homogenous material is in hand. Once compressed and cured, the resulting article exhibits the exact predetermined strength characteristics, and all the other technical and physical characteristics of the products heretofore used in the building industry.

The high strength characteristics can be achieved due to the fact that the microscopic particles of the low melting metal compounds begin to sinter already at low temperatures and react in sequence. This causes the formation of a monolithic space-lattice structure consisting of these compounds and the oxides. This chemical process, and the curing of the resin, occur completely independent of each other and without influencing each other.

The principal inorganic component is a sand of unspecified chemical composition with a moisture content at the pit of from 5–8%. The procedure according to this invention also applies to other products or structural elements, such as floor tiles of all types, building materials and building stones, and also other structured elements which share a common technological character. Despite the differing final use-areas of the products manufactured from this molding composition, they are all characterized by the following economical advantages:

a. for the manufacture of these articles, all the common types of sands can be used;
b. overall production and energy costs are reduced;
c. capital investment costs are reduced;
d. substantially lower labor costs; and
e. increased productivity of the work cycle.

The invention is described in greater detail in the following examples:

EXAMPLE I

In a mechanical mixer the following components are mixed together:

88 parts by weight of moist undried sand which is characterized by an average grain size of from 1.5–0.08 millimeters;

6 parts by weight of a phenolic resole resin with a viscosity of 3300 centipoise, and a combustion residue of 80%, 6 parts by weight of the blend of low melting metals, e.g. Pb—Sn—Al.

This mixture, constituting a homogenous blend, with a residual moisture content of 8%, is then suitable for compression molding at pressures of from 20°–150 Kg/cm². The resulting molded articles are then cured according to known procedures in a drying oven, or in heated molds. The temperature required for the curing step depends on the type of phenol resol resin used, and may be from 20°–450° C.

The prepared molding composition, as per the technical description, is ready for shaping and compression. The sintering of the finished parts occurs in stages. During the first stage the resin is cured at temperatures from 20°–450° C, and results in structurally strengthening the molded article. The essential mechanical characteristics achieved during this step, i.e., a bending strength of 210 Kp/cm², are already higher than those of conventional building materials. The subsequent sintering is achieved by means of the low melting metal compounds. Therefore, the resulting metal compounds products are dimensionally stable and highly refractory, up to a temperature of 1300° C.

EXAMPLE II

The following components are blended together:
92% by weight of undried sand with a grain size of from 2–0.08 millimeters;
4% by weight of a phenol resole resin with a viscosity of 3500 centipoise at 20° C;
2% by weight of bonding clay; and
2% by weight of powdered Wood's metal.

Processing is essentially identical to Example I. The molding composition is prepared stepwise. The individual components are added to the continuous blending process. The resin component is heated to about 28°–30° C, and then the bonding clay is added in powdered form. Finally the low melting metals or metal compounds are added and the total composite is well mixed, for example, for a period of 10 minutes. Curing and molding are then carried out in the manner described before.

EXAMPLE III

The following materials are blended in respective amounts:
88% by weight of sand, as described in examples I and II;
3% by weight of a phenol resole resin with a viscosity of 9–11 centipoise at 20° C;
3% by weight of a phenol resole resin with a viscosity of 3300–3700 centipoise at 20° C;
1% by weight of toluene sulfonic acid in 65% solution;
2% by weight of bonding clay;
2% by weight of Silumin metal powder; and
1% by weight of powdered tin.

Preparation, blending, processing, molding and curing was done as described in the previous examples.

It is to be understood that the examples only describe certain practical approaches to the invention. The invention is not limited to the practical examples listed.

We claim:

1. A process for manufacturing structural elements, consisting essentially of the steps of:
   mixing minerals as well as low melting metallic substances selected from the group consisting of lead, aluminum, tin, Wood's metal, and an aluminum composition composed of 86% aluminum, 13% silicon, and 1% iron, to form a molding composition based on thermosetting phenolic resin; and
   curing said molding composition to form such structural elements.

2. A process according to claim 1, wherein mineral sands having a grain diameter in a range of 2.0–0.08 millimeters are used.

3. A process according to claim 1, wherein mineral sands are used which contain a high foreign material component, such as up to 15–20% clay component.

4. A process according to claim 1, wherein mineral sands are used together with clay, having a moisture content at the pit of 8%.

5. A process for manufacturing structural elements, including the steps of:
   mixing minerals as well as low melting metallic substances to form a molding composition based on thermosetting phenolic resins;
   curing said molding composition to form said structural elements;
   prior to molding, the following substances are added in powdered form;
   2% Wood's metal, composed of 27% lead, 13% tin, 50% bismuth, and 10% cadmium;
   2% aluminum composition, composed of 86% aluminum, 13% silicon, and 1% iron;
   1% tin; and
   1% zinc.

6. A process according to claim 1, wherein, prior to molding, an inorganic binder of bonding clay of 160–80 micron particle size, is mixed with an organic binder of phenol resole resin, said resin having a viscosity from 3300–3700 centipoise at 20° C, and a combustion residue of 80%, and the mixing ratio of resin to powder bonding clay, at a temperature of 27° C, is 2:1.

7. A process according to claim 1, wherein there is included, prior to molding, a sand component having a grain diameter from 2.0–0.08 millimeters, and which may contain up to 20% clay and loam components, at an average moisture content of up to 20%.

8. A process for manufacturing structural elements, including the steps of:
   mixing minerals as well as low melting metallic substances to form a molding composition based on thermosetting phenolic resins;
   curing said molding composition to form said structural elements;
   the molding composition, prior to molding, is composed of the following components in parts by weight:
   92 parts of an undried sand having a grain size of from 2.0–0.08 millimeters;
   4 parts of phenol resole resin having a viscosity of 3500 centipoise at 20° C;
   2 parts of bonding clay; and
   2 parts of powdered Wood's metal.

9. A process for manufacturing structural elements, including the steps of:
   mixing minerals as well as low melting metallic substances to form a molding composition based on thermosetting phenolic resins;
   curing said molding composition to form said structural elements;
   wherein the molding composition is made up of the following components in parts by weight:
   88 parts of sand;
   3 parts of phenol resole resin having a viscosity of 9–11 centipoise at 20° C;
   3 parts of phenol resole resin having a viscosity of 3300–3700 centipoise at 20° C;
   1 part of toluene sulfonic acid in 65% solution;
   2 parts of bonding clay;
   2 parts of an aluminum composition metal powder composed of 86% aluminum, 13% silicon, and 1% iron; and
   1 part powdered tin.

10. A product produced in accordance with the process of claim 1.

11. A product produced in accordance with the process of claim 5.

12. A product produced in accordance with the process of claim 8.

13. A product produced in accordance with the process of claim 9.

* * * * *